April 24, 1928.

O. H. HANSEN

APPARATUS FOR FACILITATING THE TREATMENT OF CORN

Filed Oct. 2, 1924

1,666,932

INVENTOR-
O. H. Hansen
BY
W. H. Lieber
ATTORNEY.

Patented Apr. 24, 1928.

1,666,932

UNITED STATES PATENT OFFICE.

OSWALD H. HANSEN, OF PORT WASHINGTON, WISCONSIN, ASSIGNOR TO HANSEN CANNING MACHINERY CORPORATION, OF CEDARBURG, WISCONSIN, A CORPORATION OF WISCONSIN.

APPARATUS FOR FACILITATING THE TREATMENT OF CORN.

Application filed October 2, 1924. Serial No. 741,213.

This invention relates in general to improvements in the art of expediting the treatment of initially mixed objects of various grades or sizes, and relates more specifically to an improved method of and apparatus for facilitating effective grading, feeding and subsequent treatment of a mass of variable sized objects such as corn on the cob.

An object of the invention is to provide an improved process of facilitating the treatment of corn on the cob. Another object of the invention is to provide simple and efficient apparatus for effecting commercial exploitation of the improved process of facilitating the treatment of substances such as corn on the cob.

It has heretofore been common commercial practice in the canning industry, to treat corn bearing cobs in succession, regardless of their size, for the removal of the husks, butts and kernels. The corn cobs however vary so greatly in diameter, that it is practically impossible to construct automatic feeders for the various treating machines, which will properly handle cobs of the various sizes. The different treating machines now universally employed, are likewise of such construction that they cannot effectively treat corn bearing cobs of different diameters, without extensive adjustment of the various elements of the machine, and it is impossible to effect such adjustment during normal operation because of the rapidity with which cobs of greatly different diameters may be presented for treatment.

The present invention contemplates provision of an improved process of and apparatus for facilitating the feeding and subsequent treatment of corn on the cob in machines such as huskers, butters and cutters. In accordance with the present improvement, the corn bearing cobs which are received at the factory in mixed masses, are first graded as to size prior to feeding and treatment thereof. Each of the separated grades is subsequently fed to a machine properly adjusted to most effectively treat that particular grade of cobs, by means of an automatic feeder which is likewise especially adapted to handle such grade of cobs. In this manner, the feeders and the treating machines are capable of effectively performing their respective functions and more uniform treated product is obtainable than with the prior methods. The expressions "corn on the cob" and "corn bearing cob", as used throughout the present specification and in the claims, are intended to include complete ears of corn having the husks, the silk and the butts thereon, as well as partial ears comprising only the cobs with the kernels attached but having the husks, the silk and the butts removed A clear conception of the various steps of the improved process and of the construction and operation of one embodiment of apparatus capable of effecting commercial exploitation of the process, may be had by referring to the drawing accompanying and forming part of this specification, in which like reference characters designate the same or similar parts in the various views.

Figure 1:
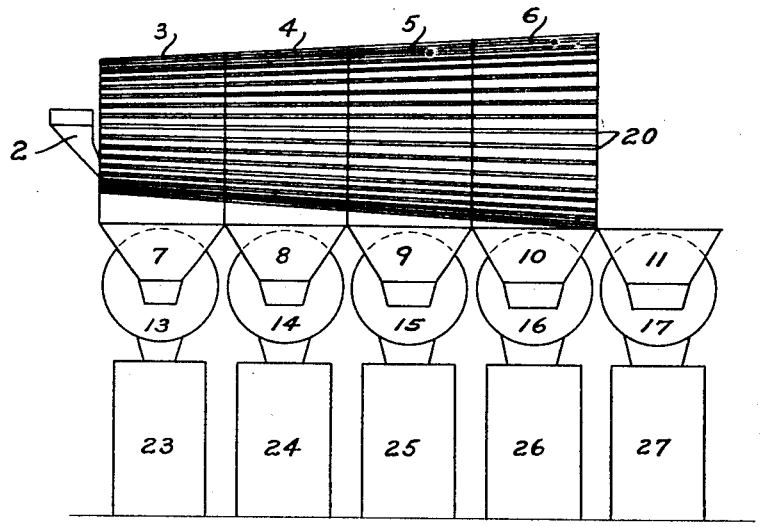
Fig. 1 is a diagrammatic side elevation of an improved grader cooperating with a plurality of automatic feeders and treating machines for corn on the cob.
Figure 2:
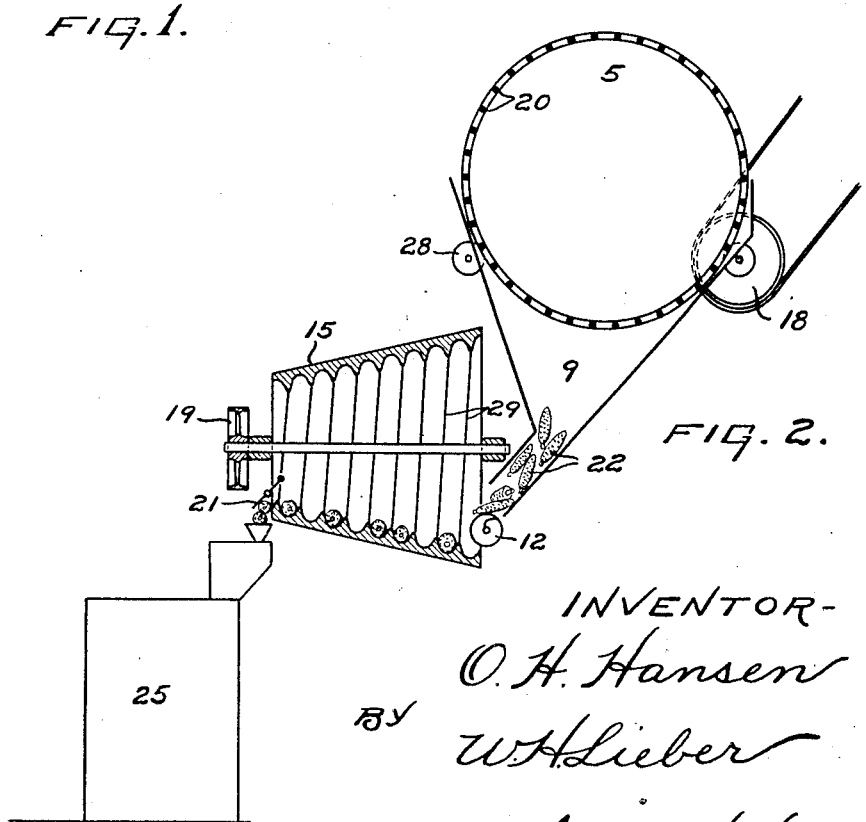
Fig. 2 is an enlarged diagrammatic sectional view of the improved apparatus for facilitating the treatment of corn on the cob.

The apparatus specifically illustrated in the drawing, comprises in general a horizontally disposed longitudinally tapered peripherally slotted grading drum consisting of grading sections 3, 4, 5, 6; a plurality of hoppers or bins 7, 8, 9, 10, 11 located beneath the grading drum; a plurality of horizontally disposed longitudinally tapered feeding drums 13, 14, 15, 16, 17 cooperating with the bins 7, 8, 9, 10, 11 respectively; and a plurality of independent treating machines 23, 24, 25, 26, 27 cooperating with the feeding drums 13, 14, 15, 16, 17 respectively.

The tapered grading drum is rotatably supported upon rollers 28 and is capable of being continuously rotated by means of a driving pulley 18. The grading drum is formed of an annular series of bars 20 and the opposite ends of the drum are open. The corn supply hopper 2 is formed to deliver the initially mixed corn bearing cobs into the open end of the grading drum having smallest diameter, and the corn cobs of greatest diameter are deliverable through the opposite open drum end, directly into the bin 11.

The distance between the bars 20 of the grading drum gradually increases from the feed to the discharge end of the drum, the spacing being least at the section 3 and increasing progressively in the successive drum sections 4, 5, 6. The hoppers or bins 7, 8, 9, 10 are located directly below the successive drum sections 3, 4, 5, 6 respectively and are adapted to catch and retain the cobs delivered through the spaces between the drum bars 20 at the respective sections. Each of the bins 7, 8, 9, 10, 11 has a downwardly directed discharge spout below which is located a transverse feed screw 12 formed to deliver corn cobs 22 in succession from the spout.

The automatic feed drums 13, 14, 15, 16, 17 are rotatable about their horizontal axes by means of driving pulleys 19 and have opposite open ends the larger of which are disposed directly beneath the discharge spouts of the bins 7, 8, 9, 10, 11 respectively. Each of the tapered feed drums has an internal cob righting ridge 29 of helical formation, and is provided with a delivery control flap 21 at its smaller open discharge end.

The treating machines 23, 24, 25, 26, 27 which may be either huskers, butters or cutters of standard construction have their inlet hoppers located directly beneath the discharge portions of the feed drums 13, 14, 15, 16, 17 respectively. The machines 23, 24, 25, 26, 27 preferably have their elements so adjusted that they will effectively treat cobs of predetermined size, and the width of the troughs between the ridges 29 of the respective feed drums 13, 14, 15, 16, 17 should also be such that cobs of predetermined size will be effectively transported thereby.

During normal operation of the apparatus to effect commercial exploitation of the improved process, the mass of mixed corn bearing cobs 22 is delivered through the smaller open end to the interior of the rotating grading drum through the supply hopper 2. Due to the rotation of the grading drum, the mass of cobs 22 admitted, is tumbled about and the smaller cobs are automatically delivered by gravity through the slots between the bars 20 of the initial grading section 3, to the bin 7 where they accumulate. The larger cobs 22 advance along the grading drum due to the tapered formation thereof. As the cobs 22 pass through the successive drum sections 4, 5, 6, cobs of progressively increasing sizes are automatically delivered to the successive bins 8, 9, 10, through the progressively increasing sized slots between the bars 20. The cobs 22 which are too large to pass through the drum periphery are eventually discharged through the larger open end of the grading drum, directly into the last receiving bin 11 of the series. In this manner, the mixed mass of cobs 22 admitted through the supply hopper 2, is automatically and effectively separated into grades which are collected in the successive bins 7, 8, 9, 10, 11.

The rotating feed screws 12 automatically remove the cobs 22 in succession from the storage bins 7, 8, 9, 10, 11 and deliver the cobs into the larger open ends of the respective feed drums 13, 14, 15, 16, 17 wherein the revolving helical ridges 29 become effective to automatically advance the cobs 22 transversely of their axes, toward the supply hoppers of the respective treating machines 23, 24, 25, 26, 27. As the successive cobs 22 are elevated by the ridges 29, toward the smaller open ends of the feed drums 13, 14, 15, 16, 17, they are eventually delivered by gravity past the controlling flaps 21, to the treating machines 23, 24, 25, 26, 27 wherein subsequent treatment such as husking, butting or cutting is automatically effected. It will thus be noted, that the automatic feed mechanism functions to gradually remove the graded cobs 22 from their respective bins 13, 14, 15, 16, 17 and to deliver the cobs in succession and in predetermined position, to the several treating machines 23, 24, 25, 26, 27.

From the foregoing description of operation of the apparatus, it will be obvious that the cobs 22 are effectively automatically graded as to size and that the various grades are automatically delivered to the treating machines which are capable of most effective treatment thereof. This eliminates necessity of adjusting the elements of the treating machines in order to effect efficient treatment of the various size cobs 22, and besides producing a treated product which is absolutely uniform, avoids undesirable delay in treatment of the cobs. It will thus be apparent that maximum efficiency and capacity of treatment is possible with the aid of the improved process and apparatus and that the treatment of corn on the cob is thereby greatly facilitated.

It should be understood that it is not desired to limit the invention to the exact steps herein described or to the details of construction of the apparatus specifically disclosed herein, for various modifications within the scope of the claims may occur to persons skilled in the art.

It is claimed and desired to secure by Letters Patent:—

1. In combination, a grading drum having peripheral slots, a treating machine, and a rotary tapered drum having an internal helical groove for feeding corn bearing cobs from said grading drum to said machine.

2. In combination, a rotary tapered grading drum, means for collecting corn bearing cobs graded by said drum, a treating machine, and a rotary tapered drum having a helical groove for feeding cobs in succession from said collecting means to said machine.

3. In combination, a rotary tapered drum having peripheral slots of gradually increasing width, means for collecting corn bearing cobs delivered through said slots, means for removing cobs in succession from said collecting means, a corn cob treating machine, and a rotary feeder for conveying the cobs in a predetermined position from said removing means to said machine.

4. In combination, a horizontally disposed rotary tapered drum having longitudinal slots of gradually increasing width, a series of hoppers located beneath said drum, a feed screw for delivering corn bearing cobs in succession from each of said hoppers, a treating machine for each hopper, and a horizontally disposed rotary internally corrugated drum for feeding cobs from each feed screw to the corresponding treating machine.

In testimony whereof, the signature of the inventor is affixed hereto.

OSWALD H. HANSEN.